UNITED STATES PATENT OFFICE.

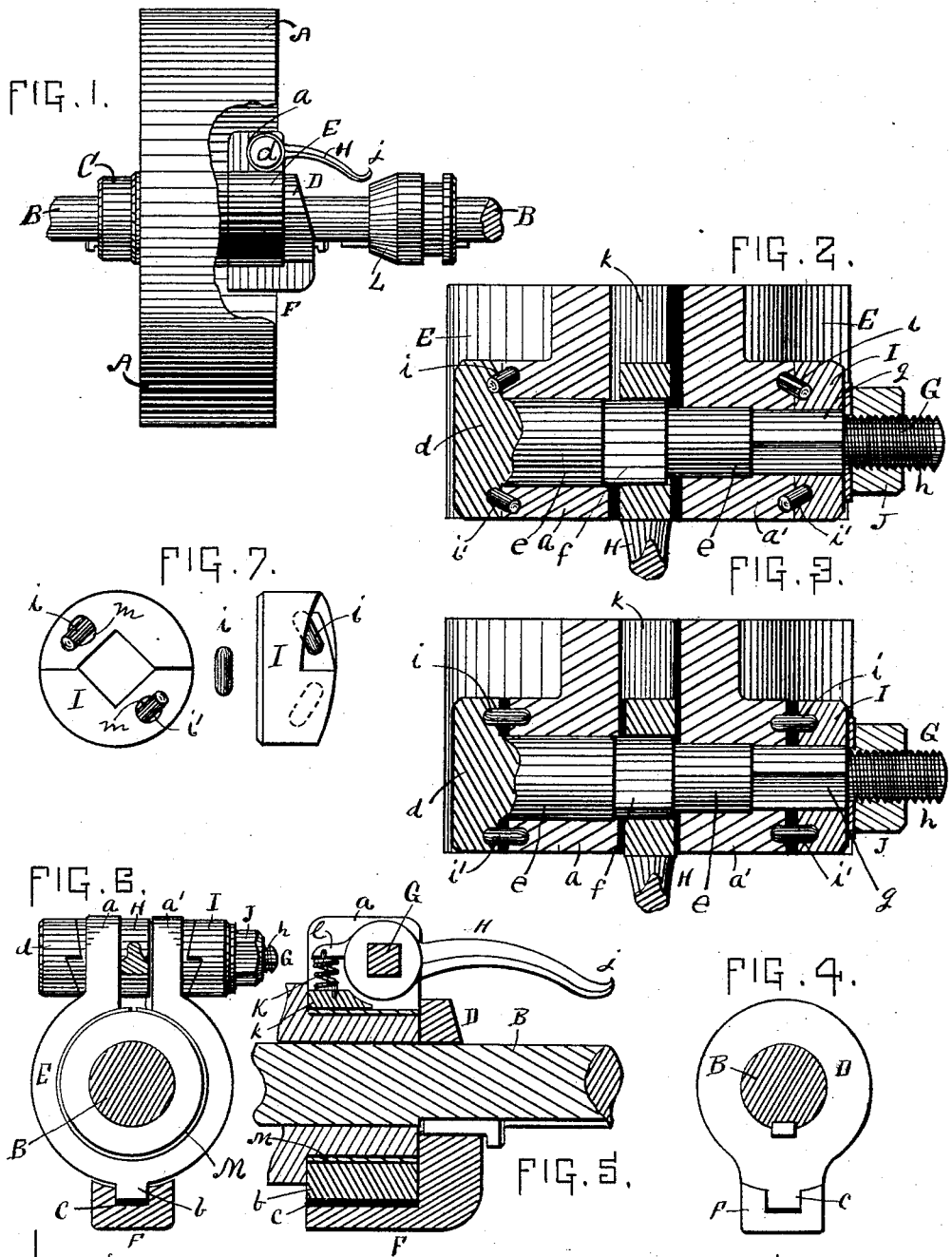

FRANCIS M. BLAKE, OF WORCESTER, MASSACHUSETTS, ASSIGNOR OF ONE-HALF TO CHARLES H. BLAKE, OF SAME PLACE.

FRICTION-CLUTCH.

SPECIFICATION forming part of Letters Patent No. 348,612, dated September 7, 1886.

Application filed July 8, 1885. Serial No. 170,990. (No model.)

*To all whom it may concern:*

Be it known that I, FRANCIS M. BLAKE, a citizen of the United States, residing at Worcester, in the county of Worcester and State of Massachusetts, have invented a new and useful Improvement in Friction-Clutches, of which the following is a specification, reference being had to the accompanying drawings, in which—

Figure 1 shows an elevation of a pulley with a portion removed and having a friction-clutch embodying my invention. Fig. 2 is a sectional view taken through the center of the actuating-spindle. Fig. 3 is a similar sectional view, but showing the position of the operating parts when the friction-strap is compressed upon the inclosed hub. Fig. 4 represents the driver by which the friction-strap is connected with the shaft. Fig. 5 is a sectional view of the friction-clutch. Fig. 6 shows the clutch as applied to the hub of the pulley; and Fig. 7 is a detached view of the washer, showing the pins by which the strap is compressed.

Similar letters refer to similar parts in the several views.

My invention relates to that class of friction-clutches in which the hub of a pulley is inclosed by an elastic strap, which is connected with the shaft upon which the pulley turns, and which is made to engage the hub, so the motion of the shaft will be imparted to the pulley, or vice versa; and my present invention is an improvement upon the friction-clutch which was made the subject of Letters Patent of the United States granted to me February 17, 1885, and No. 312,074; and it consists in the features hereinafter set forth and described, and specifically indicated in the claim.

A denotes a pulley turning loosely upon the shaft B, between a collar, C, and the driver D. Around one end of the hub of the pulley is a friction-strap, E, open on one side and having lugs $a$ $a'$. On the side of the friction-strap opposite the lugs $a a'$, I form a spline, $b$, entering a corresponding groove, $c$, in the arm F, attached to the driver D, which is attached to the shaft, and serves as a collar to keep the pulley in place on the shaft, and the rotary motion of the shaft is thereby imparted to the friction-strap, turning it about the hub of the pulley which remains at rest. Through the lugs $a$ $a'$, I pass a bolt or spindle, G, having a head, $d$. The portion $e$ $e$ of the spindle G passing through the lugs $a$ $a'$ is round, so it may rotate in the lugs. Between the lugs the spindle is made square, as shown at $f$, Figs. 2, 3, and 5, to receive the lever H. The portion of the spindle at $g$ is also made square to receive a washer, I, which is held in place against the lug $a'$ by means of a nut, J, on the screw-threaded section $h$ of the spindle G.

Between the under surface of the head $d$ and the outer surface of the lug $a$, I place two pins, $i$ $i'$, their ends entering recesses in the opposing surfaces of the head $d$ and lug $a$. The axes of the pins $i$ $i'$ are placed obliquely to the axis of the spindle G, as seen in Figs. 2 and 7, so the rotation of the spindle G will carry the outer ends of the pins $i$ $i'$ around and tend to bring them into a position parallel with the spindle G, as shown in Fig. 3, and, as the distance between the head $d$ and washer I is fixed by means of the nut J, the change in the position of the pins $i$ $i'$ from one of greater to one of lesser obliquity with the spindle G will carry the lugs $a$ $a'$ toward each other, thereby compressing the friction-strap E about the hub of the pulley A and imparting the rotary motion of the shaft to the pulley, or vice versa, in case the pulley is driven.

The rotation of the spindle G, I accomplish, as in the patent to me above referred to, by means of the lever H, whose end $j$ is raised by a sliding cone-shaped collar, L, on the shaft B. To the inner side of the lug $a$ is a lug, $k$, forming a seat for a spiral spring, K, acting against the end $l$ of the lever H, and serving to reverse the motion of the spindle G and bring the end $j$ of the lever G downward when the cone L has been removed. In practice, however, I place the pins $i$ $i'$ in such position and make them of such length that they can never assume a position parallel with the spindle G, so the elasticity of the friction-strap E will act, when the cone L has been withdrawn, to reverse the lever H and spindle G, and only a very light spring will be required beneath the end $l$ to take up any lost motion and prevent any rattling of the lever on the cone L.

It will be observed in Fig. 7 that the opposing surfaces of the lugs a a', head d, and washer I are formed cam-shaped, as was the case in the patent granted to me February 17, 1884, No. 312,074. In the clutch forming the subject of that patent, however, the compression of the friction-strap was effected by the action of the cams; but in the present construction the cam-surfaces are only a convenient form to secure a proper thickness in which to form the recesses m m, Fig. 7, to receive the ends of the pins i i'.

In the patent above cited the cam-surfaces were constantly in contact. In the present case the cam-surfaces are immediately separated by the action of the pins i i' whenever the spindle G is rotated.

Between the hub of the pulley A and the friction-strap I place an elastic ring, M, preferably of some friction material. Such, however, forms no part of my present invention.

I do not herein confine myself to the special form of pins shown or to the method of recessing them in pockets, as described, as blades placed radially to the spindle G with their edges recessed in the lugs a a', head d, and washer I, and standing obliquely to the spindle G, would serve the same purpose in substantially the same way, and would obviously fall within the scope of my invention. Other forms might also be employed for the same purpose.

The use of a washer, I, placed on a square section of the spindle, and held in place by a nut, is a convenient method of construction, and affords means of adjustment; but a washer or disk fixed to the spindle G may be used, and the amount of compression of the friction-straps varied by varying the rotation of the spindle G.

What I claim as my invention, and desire to secure by Letters Patent, is—

In a friction-clutch, the combination of an elastic strap inclosing the hub of the pulley and having lugs, a rotating spindle passing through said lugs, and carrying disks turning with said spindle and placed outside said lugs, and pins placed between the opposing surfaces of one or both of said disks and its corresponding lug on the elastic ring, said pins being placed obliquely to the axis of the rotating spindle, so its rotation will lessen their obliquity and effect the compression of the elastic ring, whose tension also serves to reverse the rotation of the spindle, as described, and for the purpose set forth.

FRANCIS M. BLAKE.

Witnesses:
RUFUS BENNETT FOWLER,
CHARLES F. STEVENS.